(12) United States Patent
Henley

(10) Patent No.: US 7,686,284 B2
(45) Date of Patent: Mar. 30, 2010

(54) AERATOR AND MIXER

(75) Inventor: Bruce Hyndman Henley, Invercargill (NZ)

(73) Assignee: Philadelphia Mixing Solutions, Ltd., Palmyra, PA (US)

( * ) Notice: Subject to any disclaimer, the term of this patent is extended or adjusted under 35 U.S.C. 154(b) by 841 days.

(21) Appl. No.: 10/572,869

(22) PCT Filed: Sep. 15, 2004

(86) PCT No.: PCT/NZ2004/000218
§ 371 (c)(1),
(2), (4) Date: Oct. 10, 2006

(87) PCT Pub. No.: WO2005/028091
PCT Pub. Date: Mar. 31, 2005

(65) Prior Publication Data
US 2007/0035045 A1  Feb. 15, 2007

(30) Foreign Application Priority Data
Sep. 24, 2003 (NZ) .................................. 528434

(51) Int. Cl.
*B01F 3/04* (2006.01)
(52) U.S. Cl. .......................... 261/28; 261/87; 261/93; 261/122.1
(58) Field of Classification Search .............. 261/28, 261/87, 91, 93, 120, 122.1, DIG. 70, DIG. 71
See application file for complete search history.

(56) References Cited
U.S. PATENT DOCUMENTS

| | | | |
|---|---|---|---|
| 3,650,513 A | | 3/1972 | Werner |
| 3,782,702 A * | | 1/1974 | King ............................ 261/87 |
| 3,820,759 A * | | 6/1974 | Hege ........................... 366/134 |
| 4,066,722 A | | 1/1978 | Pietruszewski et al. |
| 4,117,044 A | | 9/1978 | Durda et al. |
| 4,280,911 A | | 7/1981 | Durda et al. |
| 4,283,357 A * | | 8/1981 | Sidery ........................ 261/87 |
| 4,741,825 A | | 5/1988 | Schiller |
| 4,774,031 A | | 9/1988 | Schurz |
| 5,133,906 A * | | 7/1992 | Louis ....................... 261/122.1 |
| 5,336,399 A * | | 8/1994 | Kajisono ............... 210/170.02 |
| 5,356,569 A * | | 10/1994 | Von Berg ..................... 261/87 |
| 5,744,072 A | | 4/1998 | Karliner |
| 6,126,150 A * | | 10/2000 | Van Dyk ...................... 261/87 |
| 6,357,725 B2 * | | 3/2002 | Nomura et al. ................ 261/5 |
| 6,461,500 B1 * | | 10/2002 | Hoage et al. ................ 210/150 |
| 6,824,124 B2 * | | 11/2004 | Henley ........................ 261/28 |

FOREIGN PATENT DOCUMENTS

WO WO 03091169 11/1993

* cited by examiner

*Primary Examiner*—Scott Bushey
(74) *Attorney, Agent, or Firm*—Duane Morris LLP

(57) ABSTRACT

A diffuser which includes a cylinder open at one end and closed at the opposite end, the open end of the cylinder being securable to air supply; the wall of the diffuser being formed with a plurality of holes therethrough, each hole having a larger diameter on the exterior of the wall of the diffuser than on the interior of the wall of the diffuser, the longitudinal axis of each hole being inclined at an acute angle to both the radius and the longitudinal axis of the diffuser, and the orientation of each hole with respect to the longitudinal axis of the diffuser being such that when the diffuser is rotated about it longitudinal axis in use, the leading edge of each hole is at a higher elevation than the trailing edge of each hole.

11 Claims, 7 Drawing Sheets

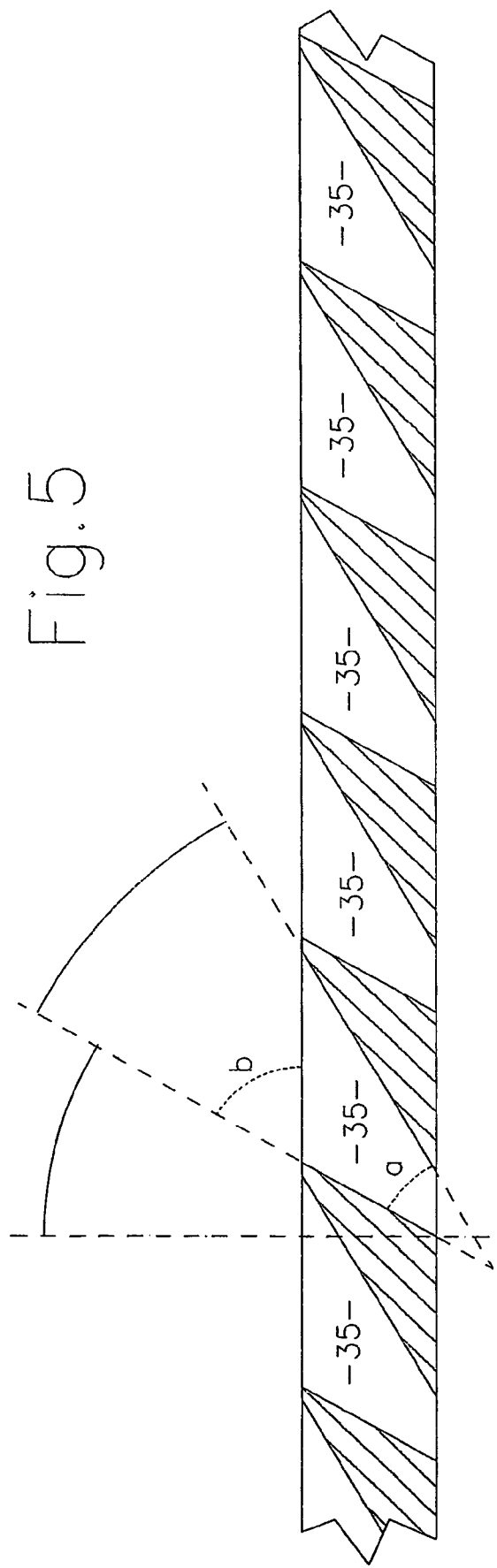

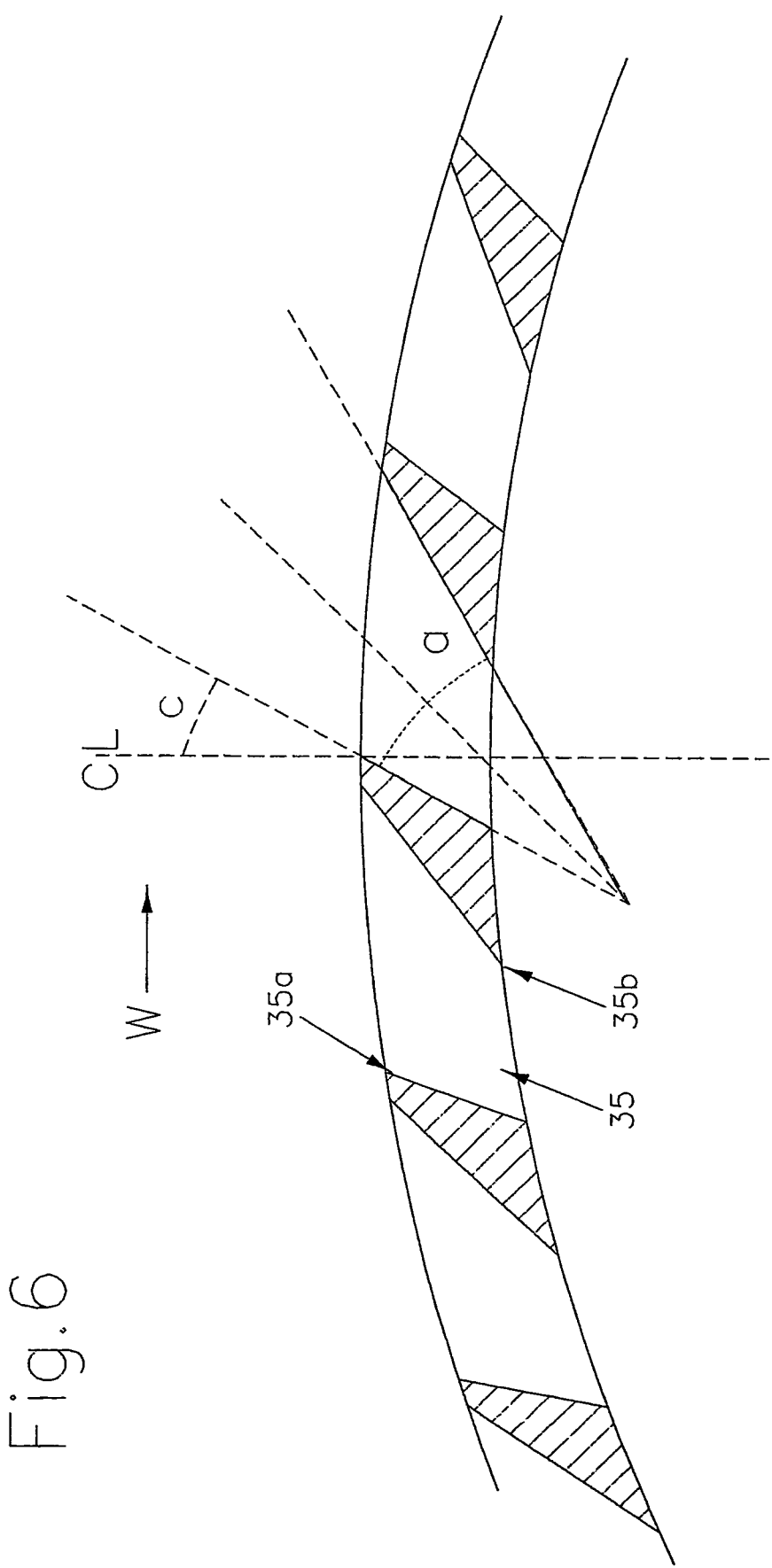

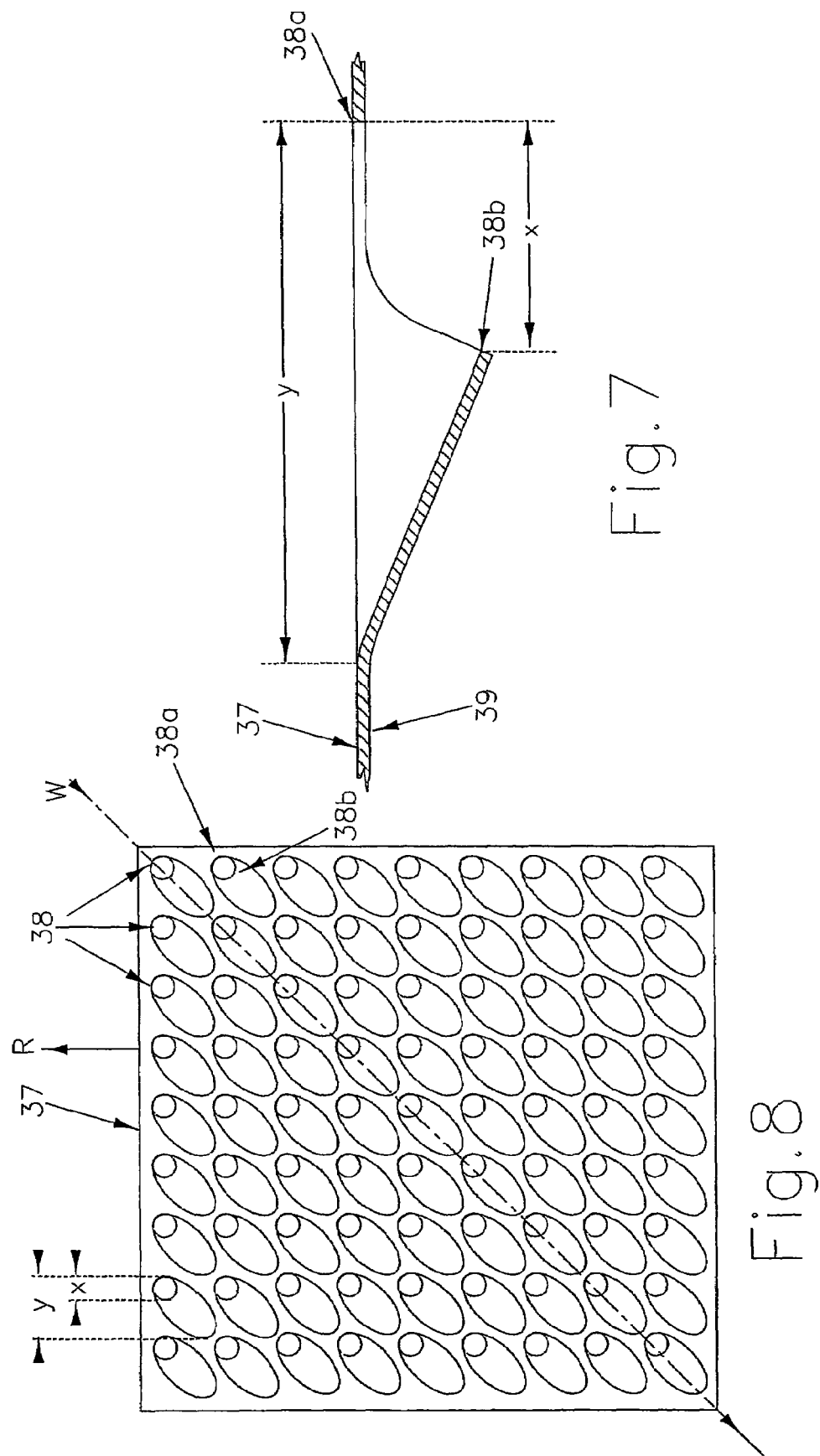

AERATOR AND MIXER

CROSS-REFERENCE TO RELATED APPLICATIONS

This application is the national stage filing of PCT/NZ04/00218, filed Sep. 15, 2004 under 35 U.S.C. 371, which claims foreign priority to New Zealand application 528,434, filed Sep. 24, 2003.

TECHNICAL FIELD

The present invention relates to improvements in the aerator/mixer disclosed in New Zealand Patent No. 508044, and to an improved diffuser for an aerator/mixer.

The device of the present invention has been designed especially for aeration and mixing of wastewater, and will be described with particular reference to this application. However, it will be appreciated that the device of the present invention could be used in a wide range of other applications where aeration and/or mixing are required.

BACKGROUND OF THE INVENTION

One known design of aerator/mixer in use at present consists of a rotatable hollow drive shaft with air intake ports at one end, open at the other end, and a propeller adjacent said other end. In use, the aerator/mixer is mounted with the propeller immersed in the wastewater or other liquid to be aerated/mixed, but with the air intake ports above the water line.

The drive shaft is rotated (e.g. by an electric motor) to drive the propeller. The rotation of the propeller mixes the liquid in which the propeller is immersed, and also induces a fluid flow across the lower, immersed, end of the drive shaft. This creates an area of reduced pressure at the lower end of the drive shaft, and hence a similar reduction of pressure at the air intake ports, drawing atmospheric air into the ports and down the shaft.

The air so drawn into the shaft is released as small air bubbles into the liquid flow pattern created by the propeller.

In wastewater treatment processes, aeration introduces air into a liquid, providing an aerobic environment for microbial degradation of organic matter. The purpose of aeration is two-fold:

1. To supply the required oxygen for metabolizing microorganisms.

2. To provide mixing so micro-organisms come into intimate contact with the dissolved and suspended organic matter.

DISCLOSURE OF THE INVENTION

An object of the present invention is to provide a diffuser for an aerator/mixer which improves the efficiency of the aerator/mixer. A further object of the present invention is the provision of an aerator/mixer of improved efficiency, and which is capable of increasing the volume of air which is provided by the apparatus, without a significant increase in the power consumption.

The present invention provides a diffuser which includes a cylinder open at one end and closed at the opposite end, the open end of the cylinder being securable to air supply; the wall of the diffuser being formed with a plurality of holes therethrough, each hole having a larger diameter on the exterior of the wall of the diffuser than on the interior of the wall of the diffuser; the longitudinal axis of each hole being inclined at an acute angle to both the radius and the longitudinal axis of the diffuser, and the orientation of each hole with respect to the longitudinal axis of the diffuser being such that when the diffuser is rotated about its longitudinal axis in use, the leading edge of each hole is at a higher elevation than the trailing edge of each hole.

The present invention further provides an aerator/mixer which includes:

a rotatable hollow drive shaft with at least one air intake port at or adjacent one end thereof and a propeller mounted adjacent the other end thereof so as to be rotatable with the drive shaft;

means for rotating the drive shaft and the propeller;

means for supplying air at above atmospheric pressure to the or each said intake port;

an air permeable diffuser as described above, mounted on said other end of the drive shaft, the diffuser being further from said one end of the drive shaft than said propeller;

the open end of the cylinder being in communication with the interior of said hollow drive shaft such that air supplied to the or each said intake port can exit from the other end of the drive shaft only through the holes in the wall of the diffuser.

BRIEF DESCRIPTION OF THE DRAWINGS

By way of example only, a preferred embodiment of the present invention is described in detail, with reference to the accompanying drawings, in which:—

FIG. 5 is an enlarged view of the circled portion of FIG. 4;

FIG. 6 is an enlarged cross-sectional view taken on the line VI-VI of FIG. 4;

FIG. 7 is a view similar to FIG. 5, but showing an alternative structure for the diffuser wall; and FIG. 8 is a plan view of the diffuser of FIG. 7

BEST MODE FOR CARRYING OUT THE INVENTION

Figure 1:
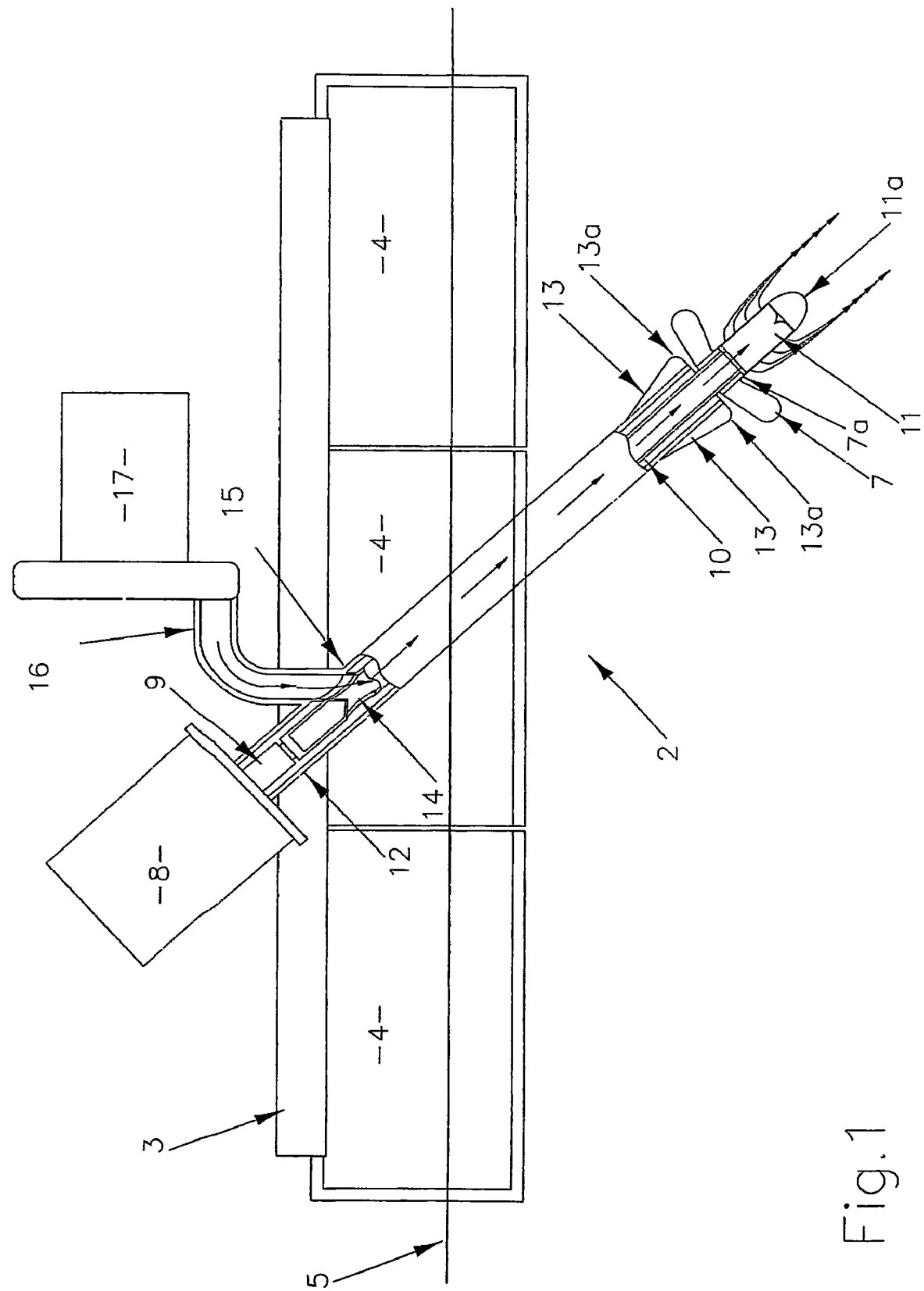
FIG. 1 is a diagrammatic side view of an aerator/mixer in accordance with the present invention, with part of the casing broken away.

Referring to FIG. 1 the drawings, and aerator/mixer 2 is supported upon a platform 3 by pontoons 4. The aerator/mixer 2 is mounted upon the platform 3 by means of support brackets (not shown) which allow the angle of the longitudinal axis of the aerator/mixer relative to the waterline (indicated by line 5) to be adjusted as necessary, and the aerator/mixer to be raised clear of the water for maintenance and repair. The support brackets and the pontoons preferably are of the type described in New Zealand patent No. 508044.

The aerator/mixer 2 may of course be supported by alternative means such as fixed mountings to bridges or walls.

The pontoons 4 allow the aerator/mixer 2 to float on the surface of the lagoon of tank with the propeller 7 of the aerator/mixer below the surface of the liquid, but the upper part of the aerator/mixer above the surface.

The aerator/mixer 2 comprises an electric motor 8 which is coupled by a known flexible coupling assembly 9 to one end of a hollow drive shaft 10. The propeller 7 is mounted adjacent the other end of the drive shaft 10, and rotates with the drive shaft. Immediately below the propeller 7, at the very end of the drive shaft 10, a diffuser 11 is mounted on, and rotates with, the drive shaft. The diffuser 11 is coaxial with the drive shaft 10 and the hollow interior of the drive shaft 10 opens into the interior of the diffuser 11. The end of the diffuser 11 remote from the drive shaft 10 is closed and has a rounded nacelle 11a secured over it. The nacelle 11a has a smoothly rounded aerodynamic shape which promotes laminar flow of the liquid past the diffuser, and reduces turbulence in the liquid. The nacelle is made of a lightweight abrasion resistant material.

The drive shaft 10 is surrounded by a housing 12 which encloses the coupling 9 and all of the drive shaft up to a point immediately above the propeller 7. The lower end of the housing 12 optionally is formed with a series of fins 13 equidistantly spaced around the circumference of the housing 12 (shown in FIG. 1 only). Each fin 13 is wedge-shaped in side view, with the widest portion of the wedge at the end of the housing 12. The slope of each fin preferably is in the range 1:6-1:10; if the fins are too steeply sloped and the aerator/mixer is used in liquid which have a substantial content of solids or other debris, there is a tendency for the fins to "rag up" i.e. for debris to build up along the length of the fin. The end 13a of each fin is rounded, also to reduce ragging up.

Figure 3:
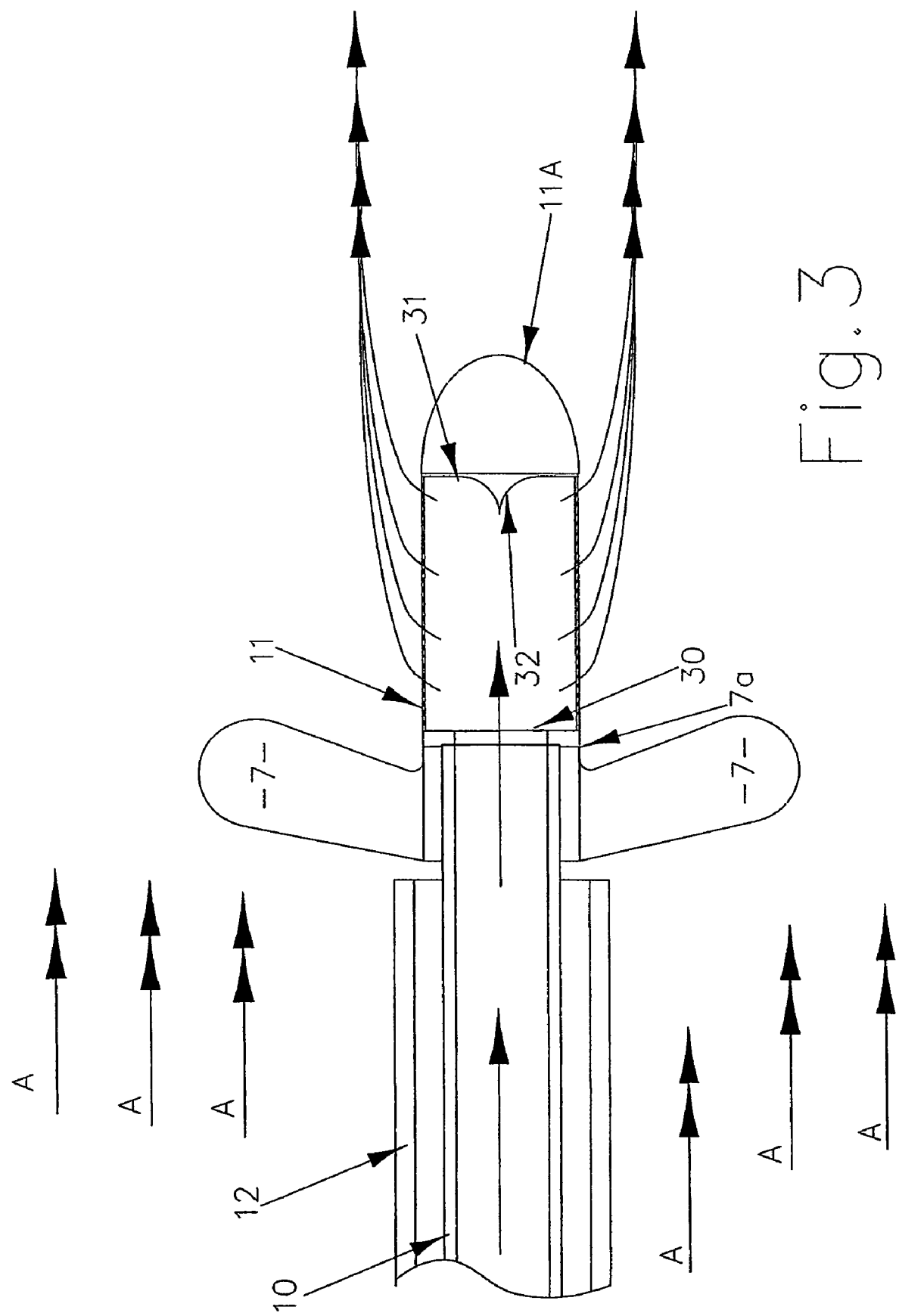
FIG. 3 is a detail of the lower portion of FIG. 1, on a larger scale.

The purpose of the fins is to stabilise the water in the area above the propeller 7 so water tends to be drawn on to the propeller in a direction parallel to the longitudinal axis of the aerator/mixer, as indicated by the double headed arrows A in FIG. 3. This increases the efficiency of the propeller 7. However, the fins 13 are advantageous only for some applications of the aerator/mixer; for all other applications, the fins 13 are omitted and the lower end of the housing 12 is simply formed with a smooth, uniform outer surface, as shown in FIG. 3.

Figure 2:
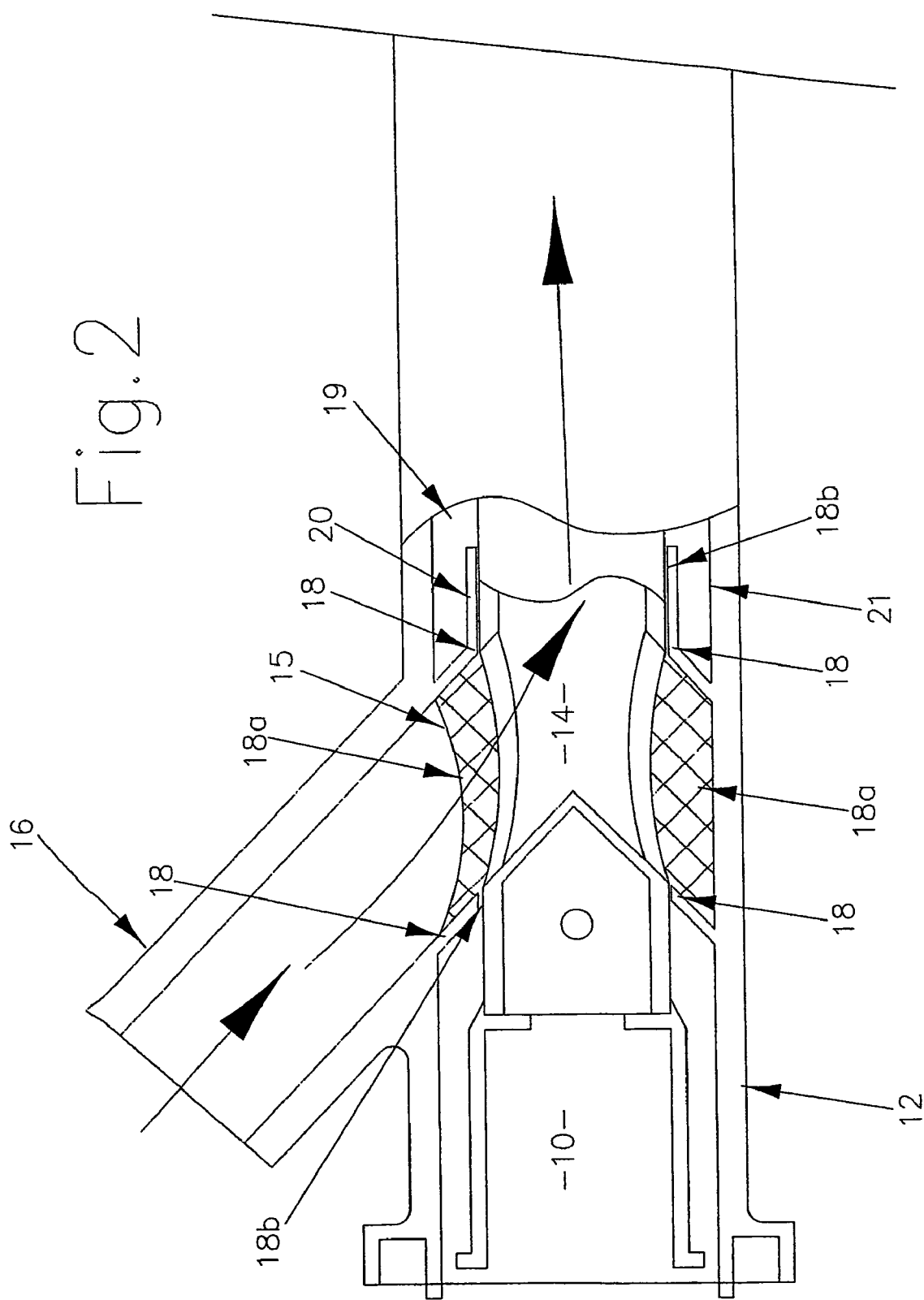
FIG. 2 is a detail of FIG. 1 on a larger scale.

As shown on a larger scale in FIG. 2, a two symmetrically spaced ports 14 are formed around the circumference of the upper end of the drive shaft 10, just below the coupling assembly 9. Each of the ports 14 opens into the interior of the drive shaft 10. An inlet 15 is formed in the housing 12, aligned with the port 14. A pair of spaced, angled circumferential vanes 18, formed integrally with the inner wall of the housing 12, are aligned with the edges of the inlet 15, and form an annular plenum 18a around the drive shaft ports 14. In use, the drive shaft 10 rotates relative to the housing 12, so a small clearance 18b must be left between the walls of the inlet 15 and the drive shaft 10. However, it is important that as little as possible of the air supplied through the inlet 15 passes into the space 19 between the exterior wall of the drive shaft 10 and the interior wall of the housing 12, since any air which passes down the space enters the liquid above the propeller 7, rather than below it, and it tends to cause cavitation of the liquid and hence damage to the propeller surfaces. The upper portion of the housing 12 may be formed with small vents (not shown) to encourage the venting of any air which does pass into the space 19. The clearance 18b between the inner edge of each vane 18 and the adjacent portion of the drive shaft 10 is the minimum operating clearance, to reduce air leakage and hence reduce pressure losses in the incoming air. To further reduce air losses, and in particular to prevent significant amounts of air from travelling down the outer surface of the drive shaft 10, the vane 18 on the downstream side of the inlet 15 is formed with an extension 20, in the form of an annular collar parallel to the drive shaft 10 and with the inner surface of the collar 20 spaced from the outer surface of the adjacent portion of the drive shaft 10 by the minimum operating clearance. The collar 20 is relatively long (typically about 40 millimetres long).

A pipe 16 is connected between the inlet 15 and an air blower of known type, mounted on the platform 3. Any of a wide range of types of blower (or equivalents such as a fan or a compressor) may be used. It is important that air passes through the inlet 15 as smoothly as possible, since any change in direction tends to cause turbulence, which in turn causes pressure losses. To avoid such losses, the pipe 16 is angled to lead smoothly into the interior of the drive shaft 10; the vanes 18 not only assist in reducing air losses, but also streamline the airflow from the pipe 16 through the ports 14.

Figure 4:
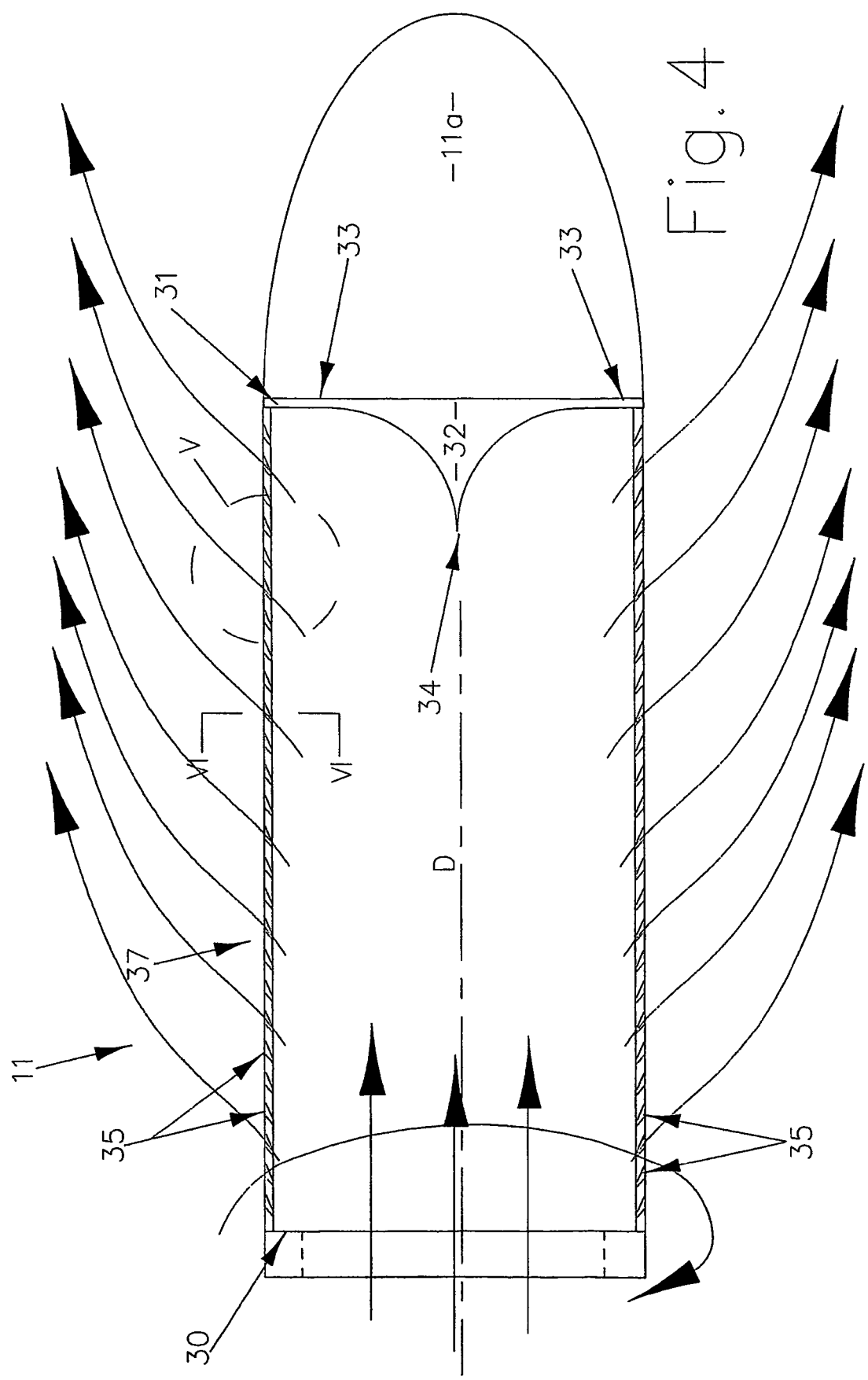
FIG. 4 is a detail of FIG. 3 on a larger scale.

As shown in detail in FIGS. 3 and 4, the diffuser 11 comprises a cylinder having the same external diameter as the boss 7a of the propeller 7, to present a smooth surface to liquid flowing past. The cylinder is open at the end 30 adjacent the drive shaft 10, and closed at the opposite end 31. The internal surface of the end 31 is formed with a turning vane 32 which provides a curved surface which tapers smoothly from a narrow portion 33 adjacent the walls of the diffuser 11 up to a central peak 34 which lies on the longitudinal axis of the diffuser.

The precise shape of the turning vane 32 is not critical:—its function is to turn the air hitting the end of the diffuser, so that air impacting on the lower end 31 of the diffuser tends to be turned with as little turbulence as possible, perpendicular to the sides of the diffuser. It is also important that the turning vane 32 does not reduce the wall area of the diffuser adjacent the end 31. Thus, the main requirement of the turning vane is that it provides a smoothly curved shape which provides a smooth transition for the impacting air.

Referring in particular to FIGS. 4-6 inclusive, substantially the whole of the wall of the diffuser 11 is formed with a plurality of holes 35 each of which extends right through the thickness of the wall, and each of which is circular or elliptical in plan and has the longitudinal axis of the hole inclined at an acute angle to both the radius and the longitudinal axis of the diffuser. In addition, each hole 35 is tapered along its length, with the wider portion of the hole at the exterior surface 37 of the diffuser wall.

The tapering of the holes enhances the Venturi effect, when liquid passes over the outside of the diffuser; the Venturi effect creates a partial vacuum inside the diffuser and thus draws air down the drive shaft 10. Preferably, the sum of the areas of the smallest ends (i.e., the interior ends) of the holes is of the order of four times the cross-sectional area of the drive shaft.

The angle 5 of each hole 35 relative to the radius and to the longitudinal axis of the diffuser are shown in detail in FIGS. 5 and 6, but it is emphasised that the precise angles are shown in those FIGS. are not critical, and are given by way of example only. The angles of inclination of each hole to the radius and to the longitudinal axis preferably approximate to the resultant angle of the combined velocity of fluid going past the diffuser and the rotation of the diffuser, in use. However, it is believed that the rounded shape of each hole and the elliptical shape of each hole in plan view make it possible for the angles of inclination of each hole to vary from the ideal and still provide a diffuser which works very effectively.

In the preferred embodiment actually illustrated, FIG. 5 shows the included angle a between the walls of the hole is about 30 degrees, and the angle of inclination b of the shorter wall to the longitudinal axis of the diffuser is about 60 degrees. As shown in FIG. 6, the angle of inclination c between the shorter wall, the hole and the radius of the diffuser is about 30 degrees.

FIGS. 7 and 8 show a variant form of the diffuser, in which the side wall of the diffuser cylinder is made from punched sheet rolled to shape. In this variant, the wall thickness of the diffuser is substantially reduced and the holes are formed in a "cheese grater" design, formed by first punching a series of spaced holes 38 through the sheet, and then pressing a part of the margin of each hole inwards, so that on the inner side 39 of the diffuser, each hole has a relatively small diameter x, but on the outer side of the diffuser the hole has a substantially larger diameter y. The shape of each hole on both the inner and outer sides of the diffuser is roughly elliptical.

This form of the diffuser is significantly cheaper to make than the variant shown in FIGS. 5 and 6, and has the additional advantage of being much lighter in weight. A further advantage is that the holes can be inclined at a greater angle to the longitudinal axis of the diffuser.

In both of the above described versions of the diffuser, it is important that the holes 35/38 are oriented relative to the longitudinal axis D of the diffuser (FIG. 4) such that, in use, the shape of the hole maximises the Venturi effect i.e., the leading edge of the hole is at a higher elevation than the trailing edge so that as the diffuser rotates, water flows over the hole (creating a partial vacuum inside the diffuser and thus drawing air down the drive shaft 10) rather tending to be scooped into the hole. If the orientation of the holes were reversed (i.e., so that the trailing edge of each hole was at a higher elevation than the leading edge), water would tend to be scooped into the holes as the diffuser rotated.

In the embodiment of FIGS. 5 and 6, the direction of water flow is indicated by Arrow W in FIG. 6, and the holes 35 are oriented such that the higher edge 35a is the leading edge and the lower edge 35b is the trailing edge.

In the embodiment of FIGS. 7 and 8, the direction of rotation of the propeller is indicated by Arrow R, the direction of the water coming from the propeller is indicated by Arrow P, and the resultant velocity of water across the diffuser is indicated by broken line arrow W. In this embodiment also, it will be noted that for each of the holes 38, the orientation of the hole relative to the longitudinal axis D of the diffuser is such that the leading edge 38a of each hole is at a higher elevation than the trailing edge 38b. Further, it will be noted that the resultant velocity of the water across the diffuser (Arrow W) is approximately aligned with the angle of inclination of each of the holes.

The above described aerator/mixer operates as follows:— the aerator/mixer is suspended as shown in FIG. 1, with the propeller 7 fully immersed in the liquid to be aerated/mixed, but with the ports 14 above the liquid. The electric motor 8 is operated to rotate the drive shaft 10, and hence the propeller 7 and diffuser 11, mixing the liquid. The mixing by itself provides a certain amount of aeration, but aeration is optimized by supplying pressurised air from the blower 17 through the pipe 16 and into the ports 14. The air then travels down the hollow interior of the drive shaft 10 into the diffuser 11, which rotates with the propeller and lies below the propeller.

As the diffuser rotates, a Venturi effect is created by the rotation of the diffuser and by the water stream created by the thrust of the propeller, which passes over the diffuser. As discussed above, the holes in the diffuser are orientated so that the resultant vector of the combined velocities maximises the Venturi effect.

The Venturi effect creates a pressure drop within the diffuser and a partial vacuum within the drive shaft. This reduces the load on the blower, allowing more air to enter the diffuser. Thus, any given capacity of blower is enabled to supply more air; conversely, the same volume of air can be supplied by a lower capacity blower. Air which is drawn into the hollow interior of the drive shaft 10 can leave only via the holes in the diffuser. The air passing through the holes in the diffuser is exposed to a double shear action as it leaves:—firstly, radial shear created by the rotation of the drive shaft, and secondly the linear shear from the water stream which is created by the thrust from the propeller. It is this double shear action which produces the desired small bubbles, which are interspersed by the rotating propeller in both vertical and horizontal vectors.

It will be appreciated that the air bubbles from the diffuser 11 enter the liquid below the propeller 7, and thus do not cause cavitation.

Simply supplying additional pressurised air to the aerator does not provide efficient aeration:—the pressurised air would tend to enter the liquid in large bubbles, which are not effective aerators. The purpose of the diffuser 11 is to reduce the size of the bubbles being introduced into the liquid, so as to optimise aeration by maximising the surface area of the bubbles per unit volume, which in turn maximises the oxygen/liquid interface. Further, the smaller the bubble size, the slower the bubble rise rate and therefore the greater the bubble "dwell time", i.e. the longer the bubbles are in contact with the liquid; this also increases the efficiency of aeration.

The above described aerator/mixer may be provided with a vortex shield (not shown) of known type. Typically, a vortex shield is a flat perforated plate which is rigidly suspended above the propeller in a plane substantially parallel to the plane of the liquid surface, but below the liquid surface. The vortex shield prevents a vortex from forming in the liquid above the propeller, and thus inhibits cavitation of the liquid, which would damage the propeller.

The invention claimed is:

1. A diffuser which includes a cylinder open at one end and closed at the opposite end, the open end of the cylinder being securable to air supply; the wall of the diffuser being formed with a plurality of holes therethrough, each hole having a larger diameter on the exterior of the wall of the diffuser than on the interior of the wall of the diffuser; the longitudinal axis of each hole being inclined at an acute angle to both the radius and the longitudinal axis of the diffuser, and the orientation of each hole with respect to the longitudinal axis of the diffuser being such that when the diffuser is rotated about its longitudinal axis in use, the leading edge of each hole is at a higher elevation than the trailing edge of each hole.

2. The diffuser as claimed in claim 1, wherein each of said holes is circular in plan.

3. The diffuser as claimed in claim 1, wherein each of said holes is elliptical in plan.

4. The diffuser as claimed in claim 1, wherein the sum of the areas of the interior ends of the holes is approximately equal to four times the cross-sectional area of the drive shaft.

5. The diffuser as claimed in claim 1 wherein the angles of inclination of each hole to the radius and to the longitudinal axis of the diffuser are approximately equal to the resultant angle of the combined velocity of fluid going past the diffuser and the rotation of the diffuser, in use.

6. The diffuser as claimed in claim 3, wherein the diffuser is made of sheet metal formed to a "cheese grater" design.

7. The diffuser as claimed in claim 1 in which the external surface of the closed end of the diffuser is provided with a nacelle having a smoothly rounded aerodynamic external shape.

8. The diffuser as claimed in claim 1 in which the internal surface of the closed end of the diffuser is provided with a turning vane which provides a smoothly curved shape to minimise turbulence of air impacting thereon.

9. An aerator/mixer which includes: a rotatable hollow drive shaft with at least one air intake port at or adjacent one end thereof and a propeller mounted adjacent the other end thereof so as to be rotatable with the drive shaft; means for rotating the drive shaft and the propeller; means for supplying air at above atmospheric pressure to the or each said intake port; an air permeable diffuser as claimed in any one of claims 1-8, mounted on said other end of the drive shaft, the diffuser being further from said one end of the drive shaft than said propeller; the open end of the cylinder being in communication with the interior of said hollow drive shaft such that air supplied to the or each said intake port can exit from the other end of the drive shaft only through the holes in the wall of the diffuser.

10. The aerator/mixer as claimed in claim 9 further including a stationary housing which surrounds a major portion of said drive shaft and which provides a housing inlet port aligned with the drive shaft air intake port; and wherein said means for supplying air at above atmospheric pressure includes a pipe connectable between a source of pressurised air and said housing inlet port; the interior surface of said housing being formed with a pair of spaced, angled circumferential vanes which are aligned with the edges of said housing inlet port so as to form an annular air plenum around the drive shaft air intake port.

11. The aerator/mixer as claimed in claim 10 wherein the circumferential vane closest to the propeller is formed with an annular collar which surrounds the adjacent portion of the drive shaft and is spaced from the exterior surface of the drive shaft by a minimum operating clearance.

* * * * *